United States Patent [19]

Brodie

[11] 4,046,947

[45] Sept. 6, 1977

[54] MATERIAL AND METHODS FOR BONDING TREADS TO TIRES

[75] Inventor: Edwin T. Brodie, Muscatine, Iowa

[73] Assignee: Bandag Incorporation, Muscatine, Iowa

[21] Appl. No.: 611,253

[22] Filed: Sept. 8, 1975

Related U.S. Application Data

[60] Division of Ser. No. 439,639, Feb. 4, 1974, Pat. No. 3,951,720, which is a continuation of Ser. No. 149,834, June 3, 1971, abandoned, which is a continuation-in-part of Ser. No. 612,026, Jan. 26, 1967, abandoned.

[51] Int. Cl.$^2$ .............................................. B29H 9/00
[52] U.S. Cl. ..................................... 428/352; 156/96; 156/289; 260/3; 260/5; 260/33.6 AQ
[58] Field of Search ............ 156/95, 96, 110 R, 123 R, 156/128 R, 289; 260/3, 5, 33.6 R, 33.6 AQ; 428/352, 494, 495, 516, 517, 519, 520

[56] References Cited

U.S. PATENT DOCUMENTS

| 1,426,672 | 8/1922 | Radford | 156/96 |
| 1,707,014 | 3/1929 | Hopkinson | 156/96 |
| 2,976,910 | 3/1961 | Nowak | 156/128 R |
| 3,039,509 | 6/1962 | Gruber | 156/95 |
| 3,136,673 | 6/1964 | Carver | 156/128 |
| 3,198,679 | 8/1965 | Iknayan et al. | 156/128 |

FOREIGN PATENT DOCUMENTS

| 956,188 | 4/1964 | United Kingdom | 156/128 |
| 908,861 | 10/1962 | United Kingdom | 156/128 |
| 873,102 | 7/1961 | United Kingdom | 156/96 |

OTHER PUBLICATIONS

Barron, H., "Modern Rubber Chemistry", Van Nostrand Co., New York City, 1948, pp. 155, 156.
Winspear, G., "The Vanderbilt Rubber Handbook", R. T. Vanderbilt Co., 230 Park Ave., New York City, 1958, pp. 391, 492, 555.

Primary Examiner—Charles E. Van Horn
Assistant Examiner—John E. Kittle
Attorney, Agent, or Firm—Cushman, Darby & Cushman

[57] ABSTRACT

A strip of rubber base bonding material for use in cold bonding a prevulcanized tread strip to a tire contains both a low-temperature vulcanizing agent and accelerators. The bonding material is compounded by a special technique which stabilizes the vulcanizing agent and the accelerator thereby avoiding prevulcanization during storage. In use the bonding material is interposed between the tread strip and the tire, and the assembly is heated to less than about 300° F under pressure to effect vulcanizing of the bonding material.

8 Claims, 3 Drawing Figures

U.S. Patent  Sept. 6, 1977  4,046,947
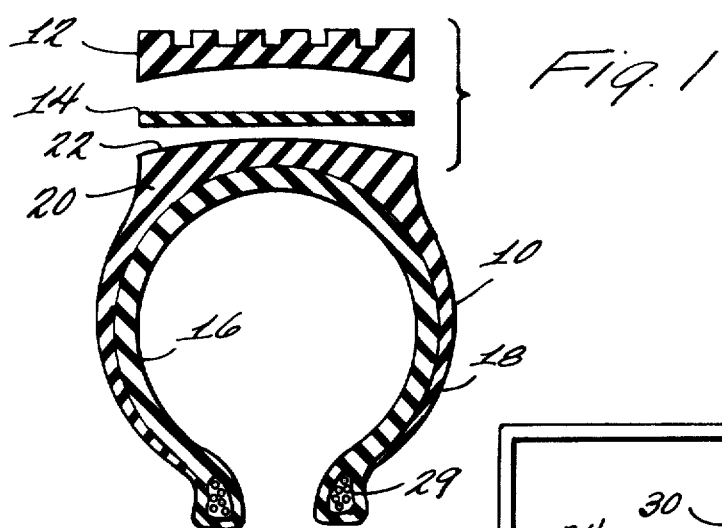
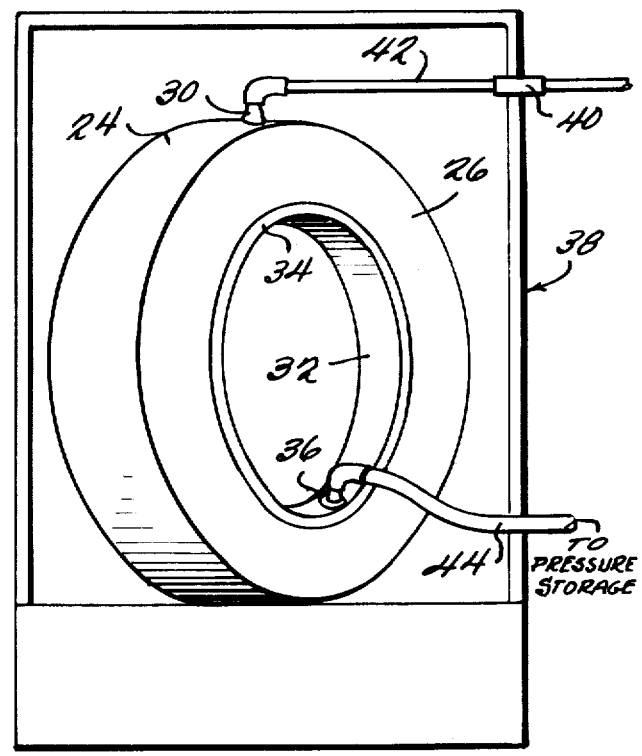
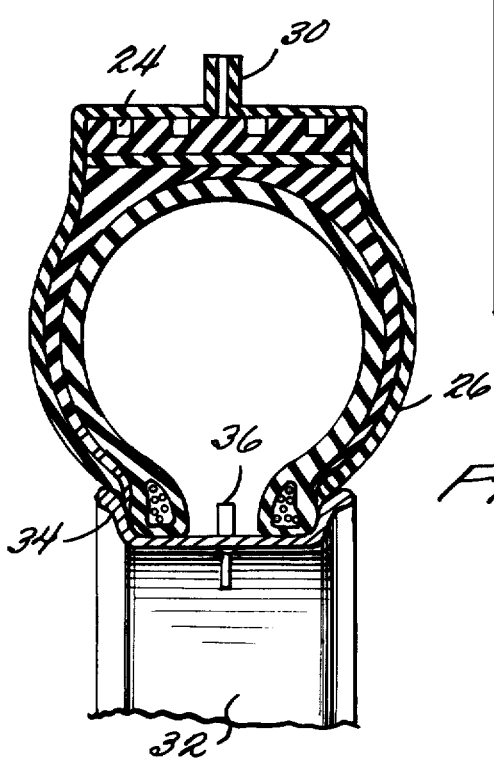

MATERIAL AND METHODS FOR BONDING TREADS TO TIRES

This application is a divisin of application Ser. No. 439,639 filed Feb. 4, 1974 now U.S. Pat. No. 3,951,720 which is a continuation of application Ser. No. 149,834 filed June 3, 1971 now abandoned which is a continuation-in-part of application Ser. No. 612,026, filed Jan. 26, 1967 now abandoned.

This invention relates to materials and methods for bonding a prevulcanized tread strip to the periphery of a tire by cold vulcanization. In particular, it relates to a novel strip of bonding material, to methods for making the material and to methods for using the material in the bonding of the tread strip to the tire.

The broad concept of cold vulcanizing or cold bonding a prevulcanized rubber tread strip to the periphery of a tire is known and is disclosed, for example, in Nowak Pat. No. 2,976,910 and Carver U.S. Pat. Nos. 3,136,673 and 3,236,709. The cold technique differs considerably from the more conventional hot vulcaizing technique in which an unvulcanized rubber tread strip is applied to a tire and is then simultaneously vulcanized and bonded to the tire by subjecting the assembly under pressure to temperatures well above 300° F.

In the cold vulcanization technique a prevulcanized rubber tread strip (that is, one which has already been cured under high pressure at temperatures well above 300° F) is bonded to a tire at relatively lower temperatures by means of rubber bonding compositions which are vulcanizable below 300° F, usually about 200° F. The cold process possesses several advantages over the hot process, one advantage being that the tread strip can be prevulcanized at higher pressure and temperature than can be employed in making a tire carcass or in a hot recapping operation, thereby making available a very tough, wear-resistant tread strip. That is, a very tough precured tread strip can be formed, for example, under pressures in the range of 300 to 1000 pounds per square inch, but an uncured tread strip cannot be subjected to these high pressures while being vulcanized to a tire casing without permanently deforming or distorting the casing. Another advantage of the cold technique is that the lower vulcanizing temperatures during bonding do not tend to cause deterioration of the previously cured tire casing, as do the higher temperatures used in the hot technique.

The cold technique, however, involves the use of bonding materials which are capable of low temperature vulcanization, and heretofore it has been the practice to maintain the vulcanizing agent and the vulcanizing accelerator separate until shortly before the bonding operation, in order to prevent premature vulcanization of the bonding material. It will be understood that the problem of premature vulcanization does not arise in hot vulcanizing operations, because the vulcanizing agent, even though present in a rubberbase material together with an accelerator, does not initiate vulcanization until high temperatures are reached. The beforementioned Nowak U.S. Pat. No. 2,976,910 teaches the use of a gummy solution containing either the vulcanizing agent or the accelerator and a strip of rubber-base material which contains whichever vulcanizing component is not present in the gummy solution. The beforementioned Carver U.S. Pat. No. 3,136,673 teaches the use of two separate bonding strips of rubber-base material, one of which contains the vulcanizing agent and the other of which contains the accelerator.

These prior processes have proven extremely successful, although they are not completely without difficulties. For example, in the gummy solution plus single strip technique it is sometimes difficult to apply the gummy solution uniformly, with consequent nonuniformity of the bond, unless costly coating apparatus is provided. In the two-strip technique the laminate of bonding strip and tread strip has been found to have relatively short storage life so that the laminates must be prepared to order or at the time of recapping.

The present invention is concerned primarily with improving and simplifying the cold vulcanizing operation by providing a single strip of rubber-base bonding material which contains both the low temperature vulcanizing agent and the accelerators in stabilized form such that the material does not undergo premature vulcanization during normal storage times at normal storage temperatures. The invention has particular utility in the retreading of tires, of course, but the materials and techniques are equally applicable to the manufacture of new tires by a process in which a treadless tire casing is manufactured separately and is then bonded to a precured tread strip.

One of the important advantages lies in the fact that prevulcanized tread strips have a long storage life as compared to the shelf life of about one year for the laminate of tread strip and one-component bonding strip described in the aforesaid U.S. Pat. No. 3,136,673. With the one-year life of the laminated tread strips it is not economical for the manufacturer and the retreader to stock large supplies, because the laminates stored for over one year must be reprocessed to remove the one-component bonding medium which has lost its potency. However, when the single-ply, two-component bonding strip is applied to the tread at recapping, the procedure becomes more flexible since no storage time is involved. In this connection it is well recognized that tire recapping is performed by a large number of independent small businesses which for the most part are not equipped to reprocess tread strips to remove bonding layers which are average and therefore of questionable quality.

A further advantage of employing the one-strip, two-component bonding medium of the present invention lies in the reduction of the time and equipment required to manufacture the single strip as compared to the plural compositions previously employed.

The invention will be further understood from the following more detailed description and from the drawing in which:

FIG. 1 is an exploded sectional view illustrating a prevulcanized tread strip and a single-ply, two-component bonding strip positioned for assembly to a tire casing;

FIG. 2 is a perspective view, partly in section, of a preferred form of apparatus for use in bonding together the parts shown in FIG. 1; and FIG. 3 is a fragmentary sectional view of part of the apparatus of FIG. 2.

COMPOUNDING THE BONDING MATERIAL

In one preferred form of the invention the bonding material is manufactured in large quantities in the form of strips of the appropriate width, covered on both sides with a protective film, wound into loose rolls and shipped to a tire retread shop where it is used as needed by the retreader. This procedure inherently includes storage time at the manufacturing plant, during transit and at the retread shop. In accordance with the present invention the compounding of the strip is carefully controlled, with emphasis on using minimum times and temperatures in mixing the curing ingredients into the rubber and in the sheeting operation, to assure that the strip has a substantial shelf life during which the low-temperature vulcanizing agent and the accelerator remain stabilized. No special ingredients are needed to prevent premature vulcanization.

Conventional equipment for mixing rubber-base material and forming the material into sheets may be employed. Mixing equipment generally comprises masticating elements such as closely spaced driven rollers which knead the components fed to them numerous times during a mixing operation. Sheeting equipment in the form of calendar rolls is also well known in the rubber industry.

The first step in the preferred compounding operation summarized above is a mixing step in which all of the ingredients, including the low-temperature vulcanizing agent and accelerator are thoroughly mixed. This mixing is carried out by separate incorporation of the vulcanizing agent and the accelerator into the rubber above room temperature and below about 165° F in as short a mixing time as is practical with the equipment being used. Preferably this is accomplished by adding the accelerator to the mixer as the next-to-last ingredient, and adding the vulcanizing agent in a second separate mix cycle in the mixer so that incorporation is rapid in a short mix time.

The mass is then removed from the mixer at about 165° F or lower and promptly cooled to room temperature. Preferably, initial cooling to about 90° F is effected within about 20 minutes. This may be accomplished by forming the warm mass from the mixer into slabs on cold rolls and then cooling the slabs with water spray plus cold air.

The slabs or other large pieces are then calendered into sheet form, although as a practical matter some storage time, for example 12 hours, occurs between the mixing of a batch and the sheeting operation. This storage time is needed to provide proper plasticity control which results from a second warm-up prior to sheeting. The storage temperature should not exceed about 75° F, and the storage time should not exceed about 72 hours, otherwise the weight of the slabs on themselves will cause varying degrees of premature vulcanization.

The slabs are then sheeted at below about 165° F, this operation including an initial rapid masticating step carried out in a mix mill under conditions such that the rubber temperature does not exceed about 180° F. The rubber from the mill is passed to a three-roll calender which has the center and top rolls controlled at between about 140° F and about 160° F, operating at a speed in the range 12-25 feet per minute linear speed, so that maximum rubber temperature exists for only about 10-15 seconds. The final sheet may be about 0.15 inches thick although the actual thickness is not critical and is determined by tire performance. The sheeting operation can alternatively be carried out with an extruder.

A corresponding film of protective material having high release properties, such as impregnated paper, cellophane, polyethylene or the like, is applied to each surface of the rubber sheet by laminating the sheet and the protective films at the calender. The film-covered sheets are stripped from the calender, slit into strips of a width corresponding to the width of the tread strip with which they are to be used, and immediately wound up over cooling drums which reduce the rubber temperature to about 85° F or lower within about one minute. The rolls then rapidly cool to room temperature (70° F-80° F). After wind-up it is important to loosen the rolls so that no pressure exists on the rubber, the presence of the non-stick protective film permitting this loosening and at the same time providing a barrier against ambient air. As indicated previously, pressure on the bonding material, such as the pressure of its own weight or the pressure within a roll wound up under tension, will cause premature vulcanization to occur even at room temperature. By loosening the rolls there is no appreciable pressure exerted on the strips, appreciable pressure in this context being those pressures that one of ordinary skill in the art could determine by simple experimentation to be sufficiently low, at the prevailing temperature, as to not cause undersirable premature vulcanization of the bonding strip.

Rolls of one-ply bonding material prepared in the above manner have a very substantial shelf life when stored or shipped at, say, 75° F, the shelf life being shorter or longer at higher or lower temperatures, respectively. Storage and shipping at 70° F or below is preferred, although temperatures up to 104° F can be tolerated for a considerable length of time without fear of premature vulcanization. If the temperature is reduced to 40° F the vulcanizing system is completely inert, and the material can be stored indefinitely. For shop use the 40° F rubber is gradually thawed over a 48-hour period to bring it up to room temperature before use.

The above-described compounding process is the preferred process for large scale production, using the preferred vulcanizing accelerators which being to become active at about 140° F or even below, where the retreader does not carry out any of the compounding operations. However, variations of the process are employed where conditions vary. For example, if the accelerator employed is one which is effective at a higher temperature such as the range 210° F-300° F, the dump temperature of the initial mixing temperature can be as high as about 240° F, the calendering or extruding temperature of the sheets can be as high as about 230° F, and the sheets can be wound up with only one protective film rather than two.

In either of the above factory methods the sheets of bonding material can be made by plying up one-half the thickness of the layer containing only the vulcanizing agent and the other half containing accelerator ingredients to provide greater storage life, although this results in a slightly slower rate or cure during the bonding operation.

It is also possible for the factory to ship the initially mixed rubber containing the vulcanizing components, without first sheeting the rubber. Since the rubber is in bulk form and subject to premature vulcanization at room temperature it must be stored and shipped at about 40° F. At its destination the rubber is thawed and then sheeted into rolls by the previously described process. Alternatively, it may be thawed in small quantities and, after the addition of a small amount of solvent, be extruded or calendered directly on to a tire or tread strip as part of the bonding operation, thereby eliminating the need for a protective cover.

In another modification of the compounding process sheeting can be carried out immediately after the initial mixing operation, if small batches are being processed. For example, mixing of a rubber batch of about 80-125 pounds to add the vulcanizing agent can be accomplished on a small first mill (60 inches or 84 inches) in about 10 minutes with rubber temperatures ob about 140° F–180° F instead of as a second step in a mixer. The mixed batch is then transferred directly to a second mill which feeds the sheeting operation (calender or extruder). A second batch is mixed on the first mill while the second mill feeds the sheeter.

In yet another modification all of the ingredients except the vulcanizing agent are mixed at the factory as described with respect to the preferred embodiment and then shipped to a retread shop or to a separate manufacturing facility. The shop or mixing facility would have a mix mill as part of its equipment and would proceed to mix in the vulcanizing agent. Small batches would then be sheeted for immediate use or extruded or calendered as part of the bonding operation. Larger batches would be sheeted with protective film and wound up into rolls for future use.

MATERIALS

In general the rubber, vulcanizing agents, vulcanizing accelerators, oil and other ingredients may be those disclosed in the before-mentioned U.S. Pats. Nos. 2,976,910, 3,136,673 and 3,236,709.

As a specific example of the composition of a bonding strip suitable for a tire casing constructed of natural and cis-4-polybutadiene rubbers, the following formula is given:

| Ingredient | Parts by Weight |
|---|---|
| uncured natural rubber | 85.00 |
| uncured cis-4-polybutadiene rubber (in the fo of 100 parts cis-4-polybutadiene plus 37.5 parts high aromatic oil) | 20.63 |
| carbon black | 28.00 |
| zinc oxide | 3.00 |
| Age Rite Resin D(an antioxidant) | 1.00 |
| Thermoflex A (an antioxidant) | 1.00 |
| stearic acid | 2.00 |
| Durez 19900 Resin (a phenolic resin) | 2.00 |
| Koresin (an alkylphenol-acetylene resin) | 1.00 |
| Methyl zimate (an accelerator) | 0.15 |
| 2-mercapto benzo thiazole (or mercapto benzo thiozole di-sulfide) | 0.60 |
| sulfur (vulcanizing agent) | 2.00 |
| Philrich5(a high aromatic oil) | 6.00 |
| B.L.E. (an antioxidant) | 1.00 |
| medium pine tar | 3.00 |
| A-32 (an accelerator) | 0.70 |
|  | 157.08 |

It will be understood, however, that the proportions and identities of the ingredients, particularly the rubber and oil, may be varied so that the bonding strip will be compatible with the composition of the tire and of the tread strip with respect to rubber and oil content. The resin content is important in obtaining a composition which resists oil migration between the various layers.

Preferably the accelerator contains approximately equal proportions of zinc salt of ethylphenyl dithiocarbaminic acid and the cyclohexyl ethyl amine salt of this acid. However, other known accelerators which will produce fast vulcanization at low temperature and which have long shelf life may also be employed, such as cyclohexyl ethylamine.

A specific advantage of the invention relates to a special composition of the one-ply bonding layer and its compatibility with a prevulcanized tread strip and with a tire carcass. In recent years passenger car and truck tires have been manufactured with tread and undertread compounds made of synthetic rubbers of high molecular weight. These rubbers are made processable by addition of high amounts of oils, particularly higher aromatic oils, and the carbon black content is proportionally higher to maintain and improve reinforcement and tread wear and lower heat build-up. These changes first came in styrenebutadiene rubbers and at present are included with other tire polymers such as cis-4-polybutadiene and cis-1-4-polyisoprene. Retread rubbers also include these oil extended components.

The high oil content of these rubbers introduces a problem in the retreading industry, because oil tends to migrate out of the tire and/or out of the tread strip, and in so doing it adversely affects the plysical properties of the retread bonding medium and reduces the curing and adhesion capabilities. This has been found to occur in the laminate of tread strip and one-component bonding material previously referred to and contributes to its degradation of physical properties and ability to cure. Migration of additional oil from a tire may occur during a cold retreading operation thus multiplying the problem. In the case of a hot retreading operation the higher temperatures employed increase migration so that in some cases a satisfactory retread cannot be obtained by a hot process.

A preferred bonding strip of the present invention, however, can absorb or tolerate oil migration from a high oil content tire or tread strip, during cold treading, without losing important physical properties. While it has a high oil content itself, it is capable of absorbing more oil by virtue of its composition. In addition, it is also capable of performing satisfactorily with low oil content rubbers. Further, migration of oil is kept at a minimum during the actual retreading operation, because the presence of both vulcanizing agent and accelerator permit vulcanizing to be effected rapidly as soon as activation temperatures are reached. When the vulcanizing components are contained in separate compositions which are brought together at the time of retreading, a delay occurs while the two components migrate into the adjoining layers, and oil migration from the tire and/or tread strip may also occur during the delay.

An example of a formula for the bonding strip employed in carrying out the present invention, as it relates to high-oil content tires and tread strips, is as follows:

| Component | Parts by Weight |
|---|---|
| uncured natural rubber (or synthetic natural rubber) | 85 ± 10 |
| uncured synthetic rubber | 15 ± 10 |
| zinc oxide | 5 – 10 |
| age resistors, e.g. phenyl beta naphthylamine | 2 – 3 |
| Sulfur or other vulcanizing agent | 1 – 3 |
| accelerators (active below about 200° F so as to effect vulcanization below about 300° F) | 1 – 3 |
| carbon black | 25 – 35 |
| extending oils (high aromatic oils) | 15 – 25 |
| resins | 5 – 10 |

One of the primary uses of the synthetic rubber, carbon black, extending oils and resins is to provide satisfactory adhesion to undertread tire compositions containing synthetic rubbers and blends of synthetic rubbers which are extended with large amounts of oils. Synthetic rubber of a type known to be used in the tires, e.g. styrene-butadiene rubber, cis-4-polybutadiene rubber and cis-1-4-polyisoprene rubber, is used for compatibility and to reduce the reversion tendency (devulcanization) of natural rubber when flexed under high heat conditions. Carbon black is selected for high extending oil tolerance, both the oil in the bonding strip itself and the oil which would migrate from a high oil content tread strip. The oil content of the bonding strip is set high enough to reduce the migration of oil from a higher oil content tread strip so as to prevent degradation of the physical properties and performance. In addition, the chemical nature of the oils used should be the same as, or compatible with, the oils used in the tread and/or tire.

If liquid oils are used in large quantities in a rubber mix, they are difficult to incorporate. In addition, the liquid oils migrate from layers of high oil content to layers of lower oil content until the content in adjacent layers equalizes. Resins are used to replace some of the oil. These are solids and do not migrate. Thus the oil content in the bonding layer is composed of both liquid oil and solid resin. The amount of the latter used is about equal to the extra oil which could migrate into the bonding layer from an adjacent higher oil material, and, reduces the amount of oil which could migrate from the bonding layer to an adjacent layer of lower oil content. The specific resins used herein are Koresin (an alkylphenolacetylene resin) and Durez 19900 (a phenolic resin) and are used in a 1 to 2 ratio for best performance in reducing oil migration problems as well as to add building tack.

Generally, the composition will include about 2 parts of sulfur to 100 parts of rubber and about 2 parts of accelerator to 100 parts of rubber.

Synthetic natural rubber, referred to in the above formula, is synthetic cis-polyisoprene which is substantially chemically identical to natural rubber (natural cis-polyisoprene).

ILLUSTRATIVE EMBODIMENT OF A BONDING OPERATION

FIG. 1 illustrates the relative positions of a tire casing 10, a tread strip 12 and a single-ply, two-component bonding strip 14, compounded as described previously, before the bonding operation is carried out. The tire casing 10 includes the usual inner carcass 16 protected by an outer side layer 18 of rubber and a worn or incomplete tread or crown portion 20 which has been prepared by being roughened along the peripheral road engaging surface 22 to receive the strip 12 of prevulcanized and profiled retread material. Both the undertread portion 20 and the tread strip 12 are formed of a mixture of natural and synthetic rubber of high oil content. The tread strip 12 has been performed by vulcanizing in a suitable press under about 600 pounds per square inch at about 320° F.

The bonding operation is carried out, broadly, by cutting appropriate lengths of the tread strip 12 and the bonding strip 14, wrapping the strips about the tire surface 22 with the bonding strip 14 disposed between the surface 22 and the tread strip 12 and subjecting the assembly to radial pressure and to sufficient heat to vulcanize the bonding strip 14.

A preferred manner of applying radial pressure and heat to the assembly is illustrated in FIGS. 2 and 3 wherein it is seen that the assembly is first enclosed on the outside with an air-tight annular flexible hood or cover 24 constructed or plastic, rubber or similar resilient material. The cover 24 includes a pair of flexible side wall members 26 which extend downwardly beyond the lateral edges of the tread strip over the side walls 28 of the tire casing 1 and over the tire shoulders 29 so as to enclose the same and be in resilient engagement therewith. The cover 24 is provided with an outlet 30 for the removal of air. The resulting assembly is mounted on a rim 32 which includes a pair of peripheral flanges 34 and a suitable means 36 to permit inflation of the tire casing 10.

As seen in FIG. 3 the portions of the elastic cover 24 which extend over the tire shoulders 29 are in sealing engagement with the shoulders 29 and with the flanges 34. Thus, the space between the tire casing 10 and the cover 24 is effectively sealed from communication with the interior of the casing. In addition, the space communicates with surroundings only by way of the outlet 30. It will be apparent that the seal between the cover 24 and the tire casing 10 may be established in other ways than shown in FIGS. 2 and 3.

The assembly of tire casing 10, bonding strip 14, tread strip 12, rim 32 and cover 24 is then placed in an autoclave or pressure chamber 38. The chamber 38 is provided with an outlet 40 that communicates with the outside atmosphere. Inside the chamber 38 the outlet 40 is connected to the outlet 30 of the cover 24 by a conduit 42. An inlet conduit 44 passes through the wall of the chamber 38 and is connected to the inlet 36 of the rim 32. The outer end of the conduit 44 is connected to a pressure source (not shown) for inflation of the tire casing 10 during its treatment in the chamber 38.

After the assembly has been thus arranged in the chamber 38, the chamber 38 is pressurized and heated to a somewhat elevated temperature between about 140° F and about 300° F, preferably about 195° F to about 210° F, by introducing a heated fluid into the chamber 38. This causes the bonding strip 14 to vulcanize to the tire surface 22 and to the tread strip 12 thereby tightly bonding the latter to the tire casing 10. Simultaneously, with the pressurizing of the chamber 38 the tire casing 10 is inflated by means of the inlet 36. The pressure in the casing 10 should exceed the pressure in the chamber 38, a pressure differential in the range of 15 - 50 pounds per square inch being preferred. While the pressure in the chamber 38 should be at least 50 pounds per square inch, a chamber pressure of 85 pounds per square inch is preferred with a pressure of 115 pounds per square inch in the tire casing 10.

Alternatively, the tire casing 10 may be partially inflated prior to treatment in the chamber 38 and subsequently inflated to the desired pressure during treatment in the chamber 38. In any event, it is essential that the pressure in the tire casing 10 exceed the pressure in the chamber 38 during vulcanization of the bonding strip 14.

Since the space intermediate the tire casing 10 and the elastic cover 24 is in free communication with the atmosphere through outlet 30, conduit 42 and the chamber outlet means 40, there will be only atmospheric pressure within such space. The pressure in the chamber 38, being greater than atmospheric pressure, will press on the surface of the elastic cover 24 exposed thereto, and thus also on the surface of the tire casing 10, the tread strip 12 and the intermediate bonding strip 14. Air entrapped in the bonding strip 14, between the tire casing 10 and tread strip 12, will be expelled and carried off to the atmosphere by way of outlet 30. In addition, the pressure of the chamber 38 acting through the elastic cover 24 will radially compress the inner surface of the tread strip 12 against the peripheral surface 22 of the tire casing 10 so as to achieve uniform surface vulcanization of the intermediate bonding strip 14. The pressure acting to press the tread strip 12 against the tire casing 10 will be the chamber pressure less atmospheric pressure which exists in the space between the cover 24 and the tire casing 10. It is apparent that no deformation and shrinkage of the tire casing 10, during the vulcanization of the tread strip 12 thereto, will occur since at all times the pressure within the tire exceeds the surrounding chamber pressure. It might be noted that this embodiment is of particular utility in retreading tires such as nylon reinforced tires which tend to shrink when exposed to the somewhat elevated temperature as encountered during vulcanization.

In pressurizing the pressure chamber 38 either air, water or other suitable fluid that may be heated can be used. The tire casing 10 may be inflated with air, water or other fluid which may be heated, regardless of the particular medium employed to pressurize the chamber 38, i.e., water, air or other fluid. It should be noted that the pressures set forth in the foregoing are merely preferred pressures and that other pressures, including pressures considerably higher than those within the aforementioned ranges may be employed, the only limitation being the practical consideration of the cost and complexity of suitable equipment.

What is claimed is:

1. A single ply strip of bonding medium for bonding a prevulcanized tread strip to the periphery of a tire, said strip containing a homogeneous mixture of unvulcanized rubber, vulcanizing agent and a vulcanizing accelerator system capable of vulcanizing said unvulcanized rubber at temperatures below about 210° F, said bonding medium being compounded and rendered stable against premature vulcanization at a room temperature of 104° F separate incorporation of the accelerator and vulcanizing agent into the rubber, said strip having applied to each of its opposite surfaces a removable protective film, said strip being wound in a loose roll whereby no appreciable pressure is exerted on the strip.

2. A bonding medium as in claim 1 wherein said room temperature is 70°–80° F.

3. A single ply strip of bonding medium for bonding a prevulcanized tread strip to the periphery of a tire, said strip comprising unvulcanized rubber, a vulcanizing agent and a vulcanizing accelerator capable of vulcanizing said unvulcanized rubber at temperatures below about 210° F, said bonding material being compounded by separate incorporation of the accelerator system and vulcanizing agent into the rubber at a temperature between about 240° F and a room temperature which is below 104° F followed by prompt cooling of the mixture to about said room temperature and sheeting the mixture at a temperature below about 230° F whereby the accelerator system and the vulcanizing agent remain stable a against premature vulcanization at said room temperature.

4. A strip of bonding medium as in claim 3 wherein the strip has applied to each of its surfaces a removable protective film and wherein the strip with the films adhered thereto is wound up in the form of a loose roll such that no appreciable pressure is exerted on the strip.

5. A bonding medium as in claim 3 wherein said room temperature is 70°–80° F.

6. A method of making a low-temperature-vulcanizable, rubber-base strip having a substantial shelf life and containing a homogeneous mixture of unvulcanized rubber, a vulcanizing agent and a vulcanizing accelerator system, said method comprising: separately incorporating into the unvulcanized rubber, at a temperature between about 240° F and a room temperature which is below 104° F a vulcanizing agent and an accelerator system capable of vulcanizing the rubber at a temperature below about 210° F and above said room temperature; promptly cooling the mixture to about said room temperature; forming the mixture into a sheet at a temperature above said room temperature and below about 230° F; and promptly cooling the sheet to a temperature at least as low as said room temperature whereby the sheet is stable against premature vulcanization for a long period of time at said room temperature.

7. A method as in claim 6 including applying a removable protective film to each surface of the sheet, slitting the sheet into strips and winding the strips into loose rolls such that no appreciable pressure is exerted on the strips.

8. A method as in claim 6 wherein said room temperature is 70°–80° F.

* * * * *